(12) United States Patent
Notohardjono et al.

(10) Patent No.: US 9,781,548 B1
(45) Date of Patent: Oct. 3, 2017

(54) LOCATING ELECTRONIC DEVICES IN AN ELECTRONIC EQUIPMENT RACK

(71) Applicant: International Business Machines Corporation, Armonk, NY (US)

(72) Inventors: Budy D. Notohardjono, Poughkeepsie, NY (US); Arkadiy O. Tsfasman, Wappingers Falls, NY (US); John S. Werner, Putnam Valley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/076,731

(22) Filed: Mar. 22, 2016

(51) Int. Cl.
*H04W 4/00* (2009.01)
*H04W 4/02* (2009.01)
*H04W 24/10* (2009.01)

(52) U.S. Cl.
CPC .......... *H04W 4/008* (2013.01); *H04W 4/023* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 6,550,674 B1 | 4/2003 | Neumark | |
| 6,959,862 B2 | 11/2005 | Neumark | |
| 8,175,925 B1 | 5/2012 | Rouaix | |
| 8,494,672 B2 | 7/2013 | Chirnomas | |
| 8,624,725 B1 * | 1/2014 | MacGregor | H04W 4/026 340/539.13 |

(Continued)

FOREIGN PATENT DOCUMENTS

| | | |
|---|---|---|
| JP | 5494730 B2 | 5/2014 |
| KR | 1020150024453 A | 3/2015 |
| WO | 2014116235 A1 | 7/2014 |

OTHER PUBLICATIONS

Riekki et al., "Touching Nametags with NFC Phones: A Playful Approach to Learning to Read," Transactions on Edutainment X, LNCS 7775, pp. 228-242, 2013, © Springer-Verlag Berlin Heidelberg 2013.

(Continued)

*Primary Examiner* — David Bilodeau
(74) *Attorney, Agent, or Firm* — Margaret A. McNamara, Esq.; Kevin P. Radigan, Esq.; Heslin, Rothenberg, Farley & Mesiti

(57) ABSTRACT

The positions and relative locations of electronic devices located within an electronic equipment rack can be determined and mapped through the reading, by a mobile device, of near field communication (NFC) tags attached to the electronic devices. The mobile device can execute a method that includes reading and recording data values from sets of nearby NFC tags in conjunction with locations of the mobile device relative to a reference location. The method executed by the mobile device can include an algorithm to determine the absolute and relative positions of the electronic devices through processing of the inclusion or exclusion of NFC tag data within the sets of read NFC tag values. The absolute and relative positions of the electronic devices can be subsequently used to create a map depicting the position of the electronic devices within the electronic equipment rack.

4 Claims, 7 Drawing Sheets

(56) References Cited

U.S. PATENT DOCUMENTS

| | | | |
|---|---|---|---|
| 8,831,514 | B2 | 9/2014 | Tysowski |
| 8,976,028 | B2 | 3/2015 | Caporizzo |
| 9,262,741 | B1 | 2/2016 | Williams et al. |
| 2006/0085295 | A1 | 4/2006 | Droste et al. |
| 2006/0210115 | A1 | 9/2006 | Nemet |
| 2009/0024764 | A1 | 1/2009 | Atherton et al. |
| 2012/0290336 | A1* | 11/2012 | Rosenblatt .............. G06Q 30/02 705/5 |
| 2013/0090131 | A1 | 4/2013 | Jalkanen |
| 2014/0139347 | A1 | 5/2014 | Forster |
| 2014/0175175 | A1* | 6/2014 | Sun .................... G06K 7/10881 235/462.49 |
| 2014/0213177 | A1 | 7/2014 | Terwilliger et al. |
| 2014/0374474 | A1* | 12/2014 | Huang ............... G06Q 30/0623 235/375 |
| 2015/0019444 | A1* | 1/2015 | Purves ................ G06Q 20/382 705/76 |
| 2015/0253028 | A1 | 9/2015 | Masuyama et al. |
| 2015/0256396 | A1 | 9/2015 | Palmer et al. |
| 2015/0371470 | A1* | 12/2015 | Brown ............... G07C 9/00896 340/5.61 |
| 2017/0038325 | A1* | 2/2017 | Takashima ........... G01N 27/121 |

OTHER PUBLICATIONS

Shafer, S., "A Framework for Creating and Using Maps of Privately Owned Spaces," LoCA 2009, LNCS 5561, pp. 174-191, 2009, © Springer-Verlag Berlin Heidelberg 2009.

Mell et al., "The NIST Definition of Cloud Computing," National Institute of Standards and Technology, U.S Department of Commerce, Special Publication 800-145, Sep. 2011, 7 pages.

Notohardjono et al., "Locating Electronic Devices in an Electronic Equipment Rack", U.S. Appl. No. 15/164,927, filed May 26, 2016.

List of IBM Patents or Patent Applications Treated as Related, May 24, 2016, 2 pages.

IBM, "zArchitecture Principles of Operation", IBM Publication No. SA22-7832-10, Mar. 2015 (1-1732 pages).

IBM, "Power ISA", Version 2.07B, International Business Machines Corporation, Apr. 9, 2015 (1-1527 pages).

Notohardjono et al., "Mapping Boxes in a Storage Bay", U.S. Appl. No. 15/209,916, filed Jul. 14, 2016 (64 pages).

Notohardjono et al., "Assigning Boxes to Storage Bays Based on Available Spaces", U.S. Appl. No. 15/209,937, filed Jul. 14, 2016 (85 pages).

Notohardjono et al., "List of IBM Patents & Patent Applications Treated as Related", U.S. Appl. No. 15/076,731, filed Mar. 22, 2016, dated Oct. 28, 2016 (2 pages).

\* cited by examiner

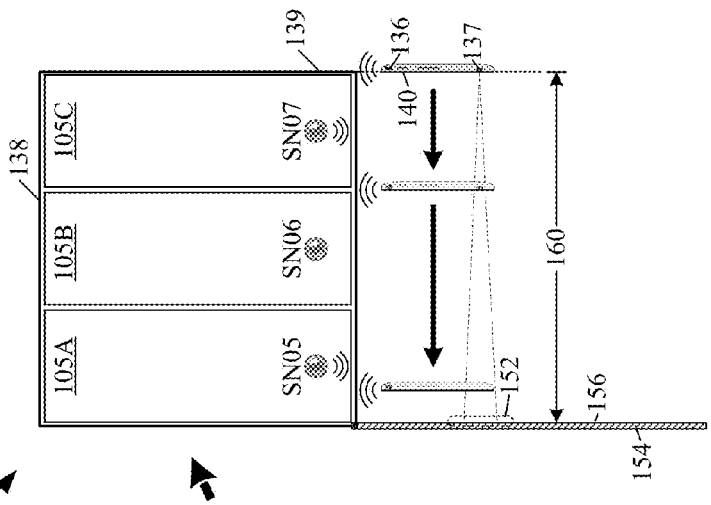
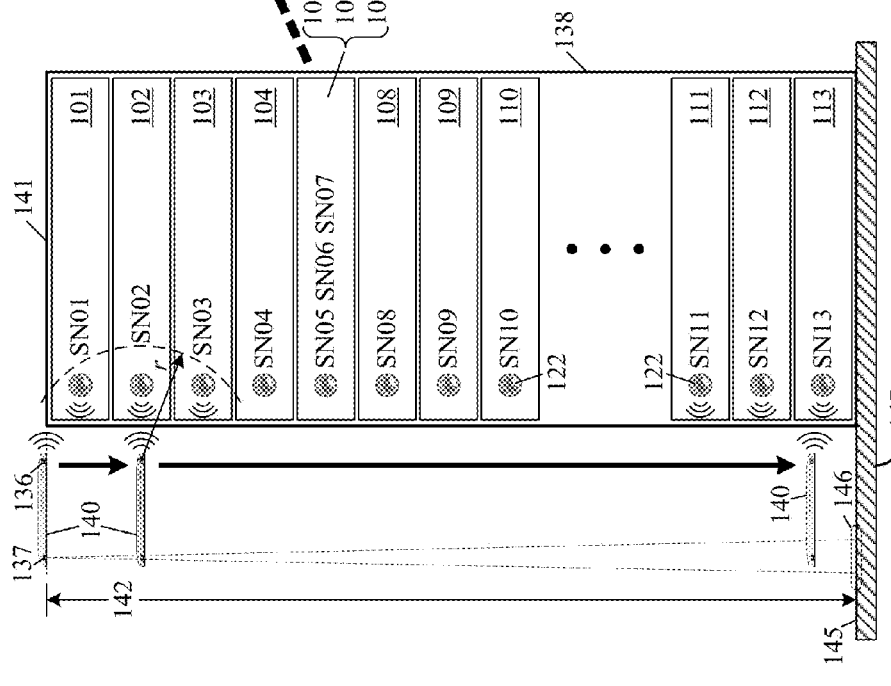
FIG. 1B
FIG. 1A

LOCATING ELECTRONIC DEVICES IN AN ELECTRONIC EQUIPMENT RACK

BACKGROUND

The present disclosure generally relates to the detection and identification of electronic devices. In particular, this disclosure relates to using a mobile electronic device in conjunction with near field communication (NFC) tags to identify and map electronic devices located within an electronic equipment rack.

A field replaceable unit (FRU) may be an electronic device or hardware unit such as a printed circuit board (PCB), electronic module or assembly that is part of an electronic system such as a computer or server, and which may be quickly and easily removed and replaced by a user or a technician. FRUs may allow a user or technician lacking in-depth product knowledge to isolate and replace faulty components or upgrade an electronic system without having to send the entire system to a repair facility. FRUs may be included in commercial and certain high-end consumer products.

Types of FRUs contained within electronic systems may include memory modules, central processing units (CPUs), data storage hardware such as hard disk drives and solid-state drives, input/output (I/O) adapters, power supply units and other standardized electronic modules and/or assemblies. A FRU may be designed to have standard dimensions and/or include a standardized electrical connector that allows it to be used interchangeably with similar FRUs within an electronic system. Incorporating FRUs into the design of electronic systems may be useful in reducing the total cost of system ownership as well as the cost of system maintenance and support costs.

SUMMARY

Embodiments may be directed towards a method. The method may include measuring, with a mobile device positioned at a first location adjacent to an electronic equipment rack, a first distance between the first location and a first reference location, and reading, at the first location, a first set of data values from a first set of near field communication (NFC) tags attached to electronic devices within the electronic equipment rack. The method may also include associating the first set of data values with the first distance and measuring, with the mobile device positioned at a second location adjacent to the electronic equipment rack, the second location along a first axis from the first location, a second distance between the second location and the first reference location. The method may also include reading, at the second location, a second set of data values from a second set of NFC tags attached to the electronic devices within the electronic equipment rack. The method may also include associating the second set of data values with the second distance and recording, in response to a first data value being included in the first set of data values and being excluded from the second set of data values, the first data value as corresponding to the first distance.

Embodiments may also be directed towards a system. The system may include an electronic equipment rack and a set of electronic devices located within the electronic equipment rack. The system may also include a set of NFC tags, each NFC tag of the set of NFC tags attached to, and containing a unique serial number of, a corresponding electronic device of the set of electronic devices. The system may also include a mobile device. The mobile device can be configured to read data values, the data values including unique serial numbers, from the set of NFC tags. The mobile device can be further configured to measure a distance between a location of the mobile device and a reference location and to record the data values read from the set of NFC tags in association with recording the distance.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1A is a side view diagram depicting a vertical scan operation of an electronic equipment rack, according to embodiments of the present disclosure.

FIG. 1B is a top view diagram depicting a horizontal scan operation of an electronic equipment rack, according to embodiments consistent with the figures.

Figure 2:
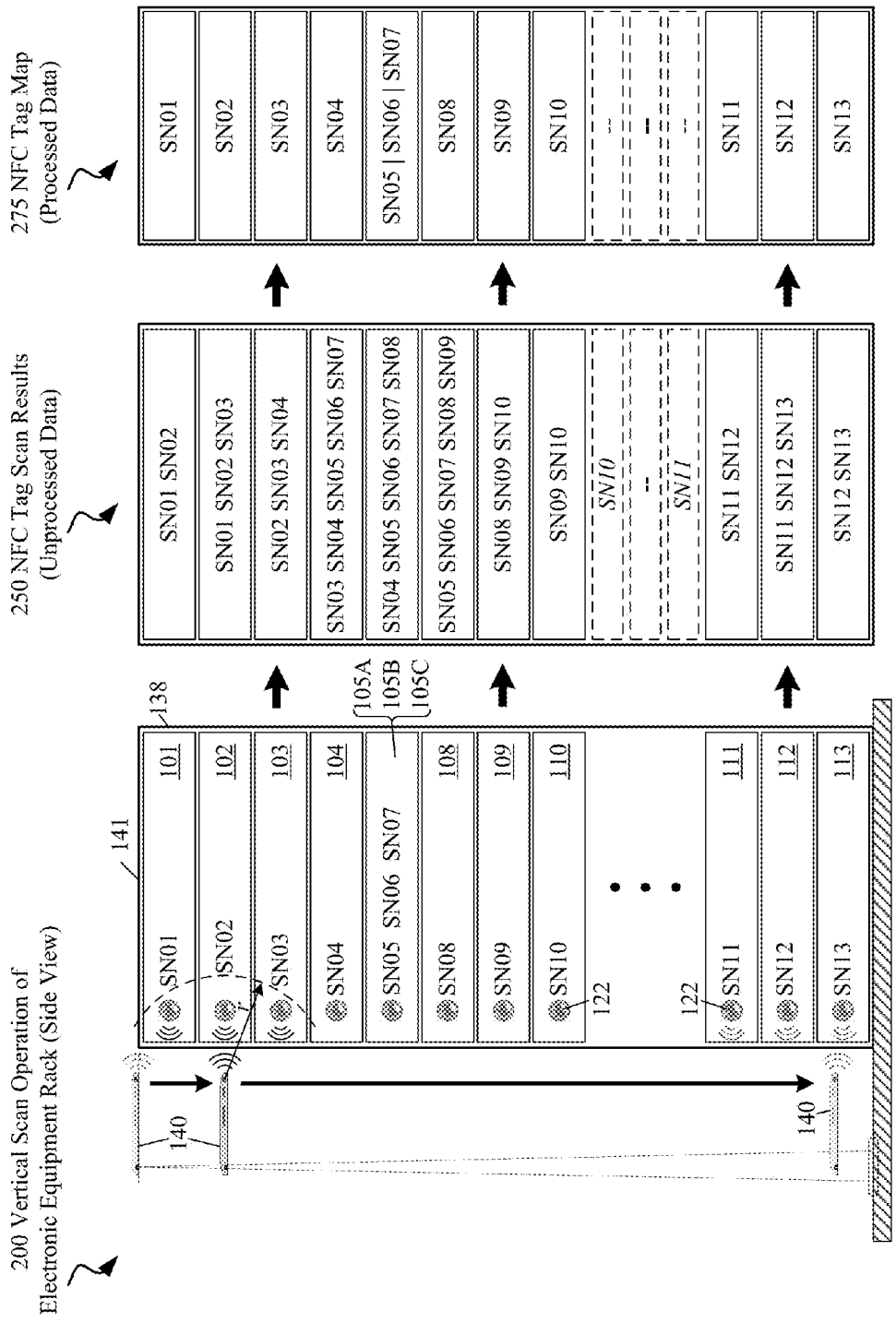
FIG. 2 includes a side view diagram illustrating a scan operation and two tables illustrating corresponding near field communication (NFC) tag scan results and an NFC tag map, according to embodiments consistent with the figures.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of identifying and mapping electronic devices located within an electronic equipment rack. Such electronic equipment racks may be used to contain servers, which may be used to provide data to clients attached to a server through a network. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as identifying and mapping electronic devices located within electronic equipment racks containing computing systems, which may be used in a wide variety of computational and data processing applications. Such computing systems may include, but are not limited to, supercomputers, high-performance computing (HPC) systems, and other types of special-purpose computers. Embodiments may also be directed towards identifying and mapping electronic devices located within electronic equipment racks containing networking and telecommunications systems.

For ease of discussion, the terms "mobile device" and "mobile electronic device" maybe used interchangeably herein, with reference to various portable/mobile electronic devices, including, but not limited to, smartphones, cell phones and tablet devices.

Electronic systems such as computers, servers and networking/telecommunications equipment are often housed within electronic equipment racks. Electronic devices incorporated in such systems may include processors, memory units, power supply units, hard disk drives and network routers/switches. Such devices can be identified and distinguished from one another through the assignment of a unique serial number to each electronic device. Accessing or reading device serial numbers can be useful for creating and maintaining a device inventory or catalog for the electronic system, which may be used in electronic system management, maintenance and upgrade operations.

In some electronic system configurations, however, a serial number label or marking placed on a top, bottom or side surface of an electronic device may be hidden from view when the device is installed within the electronic equipment rack. The label may be obscured by another electronic device or by the electronic equipment rack itself. The location of a serial number label can therefore make it difficult or impossible to read the serial number of a particular device without removing the device from the electronic equipment rack. In such instances, the electronic device, and possibly the entire electronic system, may need to be disconnected and/or disabled in order to remove the electronic device from the rack, which can be disruptive, resulting in system downtime and requiring service personnel time and effort.

According to embodiments, the positions and relative locations of electronic devices installed within an electronic equipment rack can be determined and mapped through the reading, by a mobile electronic device, e.g., a smartphone, of unique near field communication (NFC) tags attached to each of the electronic devices. The mobile device can be used to, during a scan operation, read and record data values from sets of nearby NFC tags in conjunction with corresponding locations of the mobile device relative to a reference location. The mobile device can be configured to determine the absolute and relative positions of the electronic devices through processing of the inclusion or exclusion of NFC tag data within the various recorded NFC tag data sets. The absolute and relative positions of the electronic devices can be subsequently used to create a map depicting the position of the electronic devices within the electronic equipment rack. The mobile device can also be used to rapidly detect and locate an electronic device corresponding to a particular serial number that is entered into the mobile device by a user.

A method and system for locating and mapping electronic devices within an electronic equipment rack, according to certain embodiments, may be compatible with existing and proven electronic devices and electronic equipment racks, and may be a useful and cost-effective way of rapidly and efficiently locating electronic devices. An electronic device locating system, configured according to embodiments of the present disclosure may be used in conjunction with an existing electronic system.

Aspects of the various embodiments may be used to locate and map electronic devices installed within electronic equipment racks. Aspects of the various embodiments may also be useful for providing cost-effective electronic device inventory, maintenance and upgrade solutions for use with electronic systems, by using existing and proven NFC tags, portable electronic devices and optical distance sensing technologies.

According to embodiments, the method for locating and mapping electronic devices within an electronic equipment rack can be performed independently of the operating status of the electronic devices/system, i.e., whether the devices/systems are operating or disabled. Aspects of the method can be used to rapidly and automatically locate a specific electronic device or to scan and map all the electronic device serial numbers within an electronic equipment rack. Embodiments can provide for accelerated system maintenance, inventory and cataloging tasks, while minimizing downtime and operational disruption of the electronic system and devices.

Electronic equipment racks used for containing commercially available computing systems, servers and network hardware can be useful by providing a framework within which to mount and interconnect various electronic devices or modules. Such equipment racks may be constructed according to industry standard dimensions and specifications, for example, the Electronic Industries Alliance (EIA) specification EIA-310-D for 19" equipment racks. Such specifications can include dimensions such as a standard "rack unit" or "U" height of 1.75", an electronic device width of 17.75" and depth of 36". According to this standard, for example, a typical "full" 19" rack may be 42U or 73.5" in height.

While embodiments of the present disclosure may be discussed in the context of the above-described electronic equipment rack standards and associated terminology, embodiments are not limited to such racks or electronic devices conforming to such standards. Some embodiments may conform to other sets of dimensional standards, and some embodiments may be useful for customized or non-standard electronic device and rack dimensions and configurations.

An NFC tag is a relatively small, passive electronic device that can store data, and when in close proximity to an NFC tag reader, transmit the stored data to the reader. An NFC tag can generally store between 48 bytes (B) and 32 kilobytes (kB) of data, and can be powered by electromagnetic energy transmitted by the NFC tag reader. NFC tag readers are increasingly being included in mobile devices such as smart phones and tablet devices. Certain characteristics of NFC tags can be useful in embodiments of the present disclosure. For example, an NFC tag can store data that includes a unique serial number corresponding to, and useful for, identifying an object, e.g., an electronic device, to which the NFC tag is attached.

The relatively short distance range over which NFC tag data can be read by an NFC tag reader; i.e., the "read range", can be useful in limiting the number of NFC tags that are readable by an NFC tag reader positioned at a particular location. A limitation on the number of NFC tags readable by an NFC tag reader, e.g., a reader located in a mobile device, can facilitate determining the location of particular NFC tags. For example, an NFC tag read range may be less than 10 cm, which, in some embodiments, may limit the number of NFC tags within the read range to three, which can simplify a process of determining a physical location of a particular read NFC tag.

In contrast, a read range of a radio-frequency identification (RFID) tag may be as great as 1,500 feet, which can allow a very large number of RFID tags, e.g., hundreds, to be detected and/or read by an RFID tag reader. Such a large number of readable RFID tags can complicate the process of determining a physical location of a particular RFID tag.

According to embodiments, an NFC tag can be attached to a variety of locations on or within an electronic device, in order to facilitate reading of the NFC tag by a mobile device equipped with an NFC tag reader. For example, in some embodiments an NFC tag can be attached to an inside or outside surface of an accessible front panel of an electronic device. In some embodiments, an NFC tag can be concealed beneath a company logo or other decorative feature of the front panel. The NFC tag can also be located within the electronic device, or attached to a top, bottom or side electronic device surface within a read range of the mobile device.

Certain embodiments relate to the detection and mapping of positions and relative locations of electronic devices located within an electronic equipment rack. According to embodiments, FIG. 1A is a side view diagram depicting a vertical scan operation of an electronic equipment rack 138. In embodiments, a scan operation involves a user interacting with and moving a mobile device 140, containing an NFC tag reader 136, adjacent to the electronic equipment rack 138 containing electronic devices, e.g., 101-113. The scan operation can be useful in enabling the mobile device 140 to detect NFC tags 122 attached to electronic devices 101-113, and subsequently identifying and mapping the electronic devices 101-113 based upon data contained within the NFC tags 122. Such data can include, for example, electronic device serial numbers SN01-SN13.

According to embodiments, a scan operation involves various elements of an electronic system interacting with one another in order to detect and map the electronic devices 101-113 located within the electronic equipment rack 138. The electronic system can include an electronic equipment rack 138, a number of electronic devices 101-113, each electronic device including an NFC tag 122, and a mobile device 140 equipped with an NFC tag reader 136 and a distance measurement device such as a camera 137.

In embodiments, electronic equipment rack 138 can be used to hold various types of electronic systems including, but not limited to, servers, computers or computing systems, networking systems and telecommunications systems. Such electronic systems can include a variety of electronic devices, e.g., 101-113, arranged and physically mounted within electronic equipment rack 138. In embodiments, electronic equipment rack 138 can be consistent with commercially available electronic equipment racks including, but not limited to, EIA standard 19" and 23" racks, and racks conforming to other standards. In some embodiments, electronic equipment rack 138 can be consistent with custom or non-standard racks. According to embodiments, electronic devices 101-113 can be arranged and mounted in horizontal or vertical orientations, or a combination of horizontal and vertical orientations, within an electronic equipment rack 138. A set of electronic devices 101-113 located within the electronic equipment rack 138 can include, but is not limited to, servers, data storage units, network switches and routers, processors, memory units and power supplies. A set of such electronic devices can be of homogeneous or heterogeneous types, and can be manufactured by one or more electronic equipment manufacturer(s).

In embodiments, each of the electronic devices 101-113 includes an NFC tag 122. Each NFC tag 122 can store digital data which includes a unique identifier corresponding to the electronic device the NFC tag 122 is attached to. For example, the unique identifier can be a serial number corresponding to the electronic device, which can include an arbitrary combination of alphanumeric and other characters or codes, consistent with serial numbers assigned to electronic devices by an electronic equipment manufacturer.

According to embodiments, an NFC tag 122 attached to an electronic device, e.g., 110, can also include data such as a machine type and/or description, model number and physical dimensions and characteristics of the electronic device, e.g., height, width, depth and weight. In some embodiments, other data can be stored within an NFC tag 122, including electronic device brand, processor speed, memory capacity and data storage capacity. The foregoing list is not intended to be limiting; any data that can be useful to electronic device location mapping, or to system configuration, inventory, maintenance and upgrade purposes, for example, may be stored within an NFC tag 122. According to embodiments, the amount of data related to electronic device that may be stored on an NFC tag 122 may be limited by the intrinsic data storage capability of the particular NFC tag. In some embodiments, data stored within an NFC tag 122 can reference related data stored in a mobile device 140, or can be useful as a link to a database or other form of data accessible, for example, through a wireless network connection to a remote server, by the mobile device 140.

According to embodiments, mobile device 140 can be a smartphone, cell phone, tablet device or any portable electronic device equipped with an NFC reader 136 or NFC reading capability. An NFC reader 136 within the mobile device 140 can be configured to read a number of NFC tags located within a read range "r" of the mobile device 140. In accordance with the characteristics of NFC tags and corresponding NFC tag readers, the read range "r" of an NFC tag 122 may be sufficiently small, e.g., 10 cm or less, which can limit the number of NFC tags 122 that can be read by the mobile device 140, in a particular location. The number of NFC tags 122 which can be read can also vary depending on the NFC tag 122 locations, design(s) and/or characteristics, and radio-frequency (RF) shielding adjacent to or around an NFC tag 122 location. For purposes of discussion, FIG. 1A depicts a read range "r" of the mobile device 140 that includes a maximum of three vertically arranged NFC tags, for example, the NFC tags 122 for electronic devices 101, 102 and 103.

In some embodiments, mobile device 140 can include a camera 137 or other device useful for measuring distance, e.g., 142, between the mobile device and a reference location, e.g., 146. Camera 137 may be operated in conjunction with distance measurement software executed by the mobile device 140. According to embodiments, mobile device 140 can include input/output devices such as a touchscreen, buttons, an audio system that includes a speaker and a vibrating alert motor. Such input/output devices can be useful in allowing a user to interact with the mobile device 140 by receiving notifications/signals from, and entering data, such as an electronic device serial number or commands, into the mobile device 140.

In embodiments, mobile device 140 can also include a processor and memory configured to run software, which can be useful for executing a method, for example, of scanning NFC tags 122, taking distance measurements, and creating a corresponding map of electronic devices located within an electronic equipment rack 138. Memory within the mobile device 140 can be used to record the data values read from NFC tags 122 in association with recording corresponding distance measurements.

According to embodiments, FIG. 1A illustrates a vertical scan operation of an electronic equipment rack. The vertical scan operation can begin with the mobile device 140 being held, by a user, adjacent to top surface 141 of an electronic equipment rack 138. For example, the top surface 141 can be at a distance 142 from a reference location 146 on a horizontal surface 145 of a floor 147, which supports the electronic equipment rack 138. For ease of discussion and illustration, a vertical scan operation will be described herein as starting at the top surface 141 of electronic equipment rack 138, with the mobile device 140 subsequently being moved by a user along a vertical axis towards the reference location 146. This illustration and discussion, however, are not limiting; in some embodiments the vertical scan operation may begin at or near the reference location 146 and progress upwards towards the top surface 141 of an electronic equipment rack 138.

According to embodiments, at the beginning of the vertical scan operation, the mobile device 140 is positioned so that a camera 137, or other distance measuring device within the mobile device 140, is oriented towards the reference location 146. This orientation is maintained throughout the vertical scan operation by a user, allowing the camera 137 to measure distances, i.e., heights, between the mobile device 140 and the reference location 146. In some embodiments, the vertical scan operation may begin at a location above the top of the electronic equipment rack 138, so that electronic devices, e.g., 101 and 102, located near the top of the electronic equipment rack 138 may be properly identified.

According to embodiments, the vertical scan operation continues with the user moving the mobile device 140 downward towards the reference location 146. The motion of the mobile device 140 during a vertical scan operation is generally along a vertical axis from the top surface 141 of the electronic equipment rack 138 to the reference location 146. It may be understood that some horizontal, i.e., side-to-side, motion may occur during the vertical scan operation, for example, as a result of unsteadiness of a user's hand while moving mobile device 140.

During the downward motion of the mobile device 140, data from NFC tags 122 is read by the NFC tag reader 136 and distance measurements are taken by the camera 137. Data from the NFC tags 122 can include serial numbers, e.g., SN01-SN13, that uniquely correspond to electronic devices to which the NFC tags 122 are attached. According to embodiments, each electronic device can have a unique identifying serial number, and a potentially non-unique machine name and/or other data contained within an attached NFC tag 122.

In some embodiments, reading of data from NFC tags 122 and taking distance measurements may both occur continually during the downward motion of the mobile device 140. In some embodiments, NFC tag reading and distance measurements may occur at discrete time intervals, for example, repeated every 100 ms. In some embodiments, NFC tag data may be read at regular, discrete distance intervals, for example every 0.5".

According to embodiments, data from sets of NFC tags 122 can be read at a particular location of the mobile device 140. The limited read range "r" of NFC tags 122 can be useful, during the vertical scan operation, by limiting the number of NFC tags 122 that can be read by the mobile device 140 at a particular location. Such limitation can facilitate determining the location and/or relative position of a particular NFC tag 122 and its corresponding electronic device, e.g., 101. In some embodiments, the vertical scan operation is completed when the mobile device 140 is within a minimum distance of reference location 146. In some embodiments, the vertical scan operation is completed when the mobile device 140 comes sufficiently close to reference location 146 to read the NFC tag 122 closest to electronic equipment rack floor 147.

In some embodiments, the mobile device 140 can be configured to provide feedback to a user in response to the positioning, during a vertical scan operation, of the mobile device relative to the electronic equipment rack. For example, a sound, tone, or vibrational alert may be used to notify the user that the mobile device 140 is not within a read range "r" of any NFC tags 122. Such feedback may be useful in assisting the user with correct positioning of the mobile device 140 to properly read NFC tags 122 and measure heights of the mobile device 140 during the vertical scan operation. According to embodiments, data values read from NFC tags 122 and corresponding distance measurements are associatively recorded, for example, within a memory for data storage device within the mobile device 140.

In some embodiments, mobile device 140 can be configured to receive a "target" serial number of an electronic device that a user may desire to locate, and if an NFC tag 122 containing the target serial number is read during a vertical scan operation, the mobile device 140 can issue an alert to a user. For example, a particular "target" electronic device may be scheduled for maintenance or replacement, or may need to be located for inventory management purposes. Once the target serial number is entered into the mobile device 140, if an NFC tag 122 containing the serial number is read, the mobile device 140 can issue an alert such as a tone, sound, vibrational alert or text-to-speech message to the user, indicating that the mobile device 140 is adjacent to the target electronic device. In some embodiments, multiple target serial numbers may be entered into the mobile device 140, resulting in an alert being triggered if any of the target serial numbers are detected in NFC tag 122 data.

Electronic device 105, FIG. 1A, can represent a side view of electronic devices 105A, 105B and 105C, as depicted in top view FIG. 1B. Although electronic devices 105A, 105B and 105C share the same vertical position, they may be placed in a side-by-side arrangement, as depicted in the top view of FIG. 1B. In embodiments, in a vertical scan operation, the mobile device 140, at a certain position, may detect serial numbers SN05, SN06 and SN07 simultaneously. If the mobile device 140 is unable to determine or calculate a vertical position difference between the NFC tags 122 of electronic devices 105A, 105B and 105C, then it can initiate, for example, through a message to a user, a horizontal scan operation, as depicted in FIG. 1B.

According to embodiments, Table 1, below, may contain data related to various electronic devices having unique serial numbers. The data contained in Table 1 can be stored in a file such as a text file, a database or a spreadsheet within the mobile device 140. Data in Table 1 can include characteristics of electronic devices such as machine types and physical dimensions, i.e., height, width and depth, which can be useful to the mobile device 140 in determining the location and/or position of an electronic device within an electronic equipment rack 138. According to embodiments, such data can be indexed or referenced by an electronic device's unique serial number. Various types of data such as serial numbers, machine types and device heights are depicted in Table 1, however this depiction is not intended to be limiting. Any type of data useful to a method of determining and mapping electronic device positions within an electronic equipment rack, or useful for system configuration, inventory, maintenance and upgrade purposes, for example, may be stored within Table 1.

In some embodiments the data in Table 1 may be contained in mobile device 140, and in some embodiments such data may be downloaded and/or refreshed to the mobile device 140, over a network such as the Internet, from a remote server. In embodiments, if a serial number read from an NFC tag 122 is not located in Table 1, the mobile device 140 can initiate a request, to a remote server, or to a system administrator or other recipient, to update electronic device data associated with the serial number.

In embodiments, the "Serial #" column of Table 1 denotes a listing of electronic device serial numbers. A serial number may be useful in uniquely identifying and distinguishing a particular electronic device from other electronic devices, and may be used as an index within the table to reference other characteristics or properties of the electronic device. For example, electronic device having serial number SN20 may be understood to be a hard drive having a device height of 88.90 mm. In embodiments, a serial number may consist of any unique combination of alphanumeric and/or special characters. The serial number of an electronic device can be assigned to the electronic device by an electronic device manufacturer.

The "Machine Type" column of Table 1 denotes a descriptor of the type of electronic device that is associated with a particular serial number in the table. Machine types included within a map of an electronic equipment rack can be useful in identifying particular electronic devices to a user. Machine types may include, but are not limited to, descriptors such as "Processor", "Memory", "Power Supply", "Hard Drive", "Network Switch" and "Network Router".

The "Device Height" column of Table 1 denotes the heights of electronic devices listed within the table. Heights can be described using various units of measure, e.g., "rack units" ("RU", or "U"), in., or mm. Device heights can be useful to a method, performed by a mobile device 140, of determining vertical electronic device positions within an electronic equipment rack.

The "Device Width" column of Table 1 denotes the widths of electronic devices listed within the table. Widths can be described using various units of measure, e.g., in., or mm. Device widths can be useful to a method, performed by a mobile device, of determining if a number of electronic device are positioned at the same horizontal location within an electronic equipment rack.

In embodiments, the "Rack Location" column of Table 1 denotes a vertical position assigned to a particular electronic device within the electronic equipment rack. This vertical position can be assigned by a method performed by a mobile device 140. Rack locations can be described using various units of measure, e.g., "rack units" ("RU", or "U"), in., or mm. Data contained in the "Rack Location" column can be useful in creating a map depicting the location of electronic devices within an electronic equipment rack.

TABLE 1

Electronic Device Characteristics

| Serial # | Machine Type | Device Height | Device Width | Rack Location |
|---|---|---|---|---|
| SN10 | Processor | 2 U | 17.75" | 42 U |
| AB_997 | Network Router | 1 U | 17.75" | 40 U |
| 23xY556 | Memory | 44.45 mm | 6" | 39 U |
| SN20 | Hard Drive | 88.90 mm | 17.75" | 37 U |
| SN18 | Memory | 1 U | 17.75" | 36 U |
| SN27 | Memory | 1 U | 17.75" | 35 U |
| XQ29453 | Power Supply | 2 U | 17.75" | 33 U |
| 23xY556 | Network Switch | 1 U | 17.75" | 32 U |

According to embodiments consistent with FIG. 1A, FIG. 1B is a top view diagram depicting a horizontal scan operation of an electronic equipment rack 138. The horizontal scan operation depicted in FIG. 1B can be initiated in response to the vertical scan operation of FIG. 1A detecting multiple NFC tags 122 located at a particular vertical distance from reference location 146. For example, a vertical scan operation may depict multiple NFC tags 122 having serial numbers SN05, SN06 and SN07 at a particular distance from reference location 146. In embodiments, the number of electronic devices and corresponding NFC tags 122 located at an the same vertical location within the electronic equipment rack 138 may be two or more depending upon the electronic device dimensions such as device width.

In response to this detection, mobile device 140 may signal a user to initiate a horizontal scan operation through an alert such as an audible tone, text-to-speech or visual message. In embodiments, the horizontal scan operation is initiated at a height at which the mobile device 140 detected multiple NFC tags 122.

In embodiments similar to a vertical scan operation, a horizontal scan operation involves a user moving a mobile device 140 in a lateral direction, adjacent to the electronic equipment rack 138 containing electronic devices, e.g., 105A, 105B and 105C. A horizontal scan operation can be useful in the detecting, with the mobile device 140, of NFC tags 122 attached to electronic devices, e.g., 105A, 105B and 105C, and subsequently identifying and mapping the electronic devices 105A, 105B and 105C, in conjunction with electronic devices identified and mapped through the vertical scan operation.

In some embodiments, the horizontal scan operation begins with the mobile device 140 being held, by a user, adjacent to a side surface 139 of an electronic equipment rack 138. For example, the side surface 139 can be at a distance 160 from a reference location 152, located on a vertical surface 156 of an electronic equipment rack door 154, attached to electronic equipment rack 138. For ease of discussion and illustration, a horizontal scan operation is described herein as starting at one side of electronic equipment rack 138, with the mobile device 140 then being moved along a horizontal axis towards a reference location 152. This illustration and discussion, however, are not limiting; in some embodiments the horizontal scan operation may begin at or near a reference location 152 and progress laterally towards a side surface, e.g., 139, of the electronic equipment rack 138. In some embodiments, the horizontal scan operation may proceed towards a electronic equipment rack door located on the left side of the electronic equipment rack, and in some embodiments, may proceed towards a electronic equipment rack door located on the right side of the electronic equipment rack. In embodiments, the user may specify to the mobile device 140 that the location of the electronic equipment rack door 154 is either on the left or right side of the front of the electronic equipment rack 138. According to embodiments, the mobile device 140 can signal or indicate to the user, for example through an audible alert, a height at which to begin a horizontal scan operation.

According to embodiments, at the beginning of the horizontal scan operation, the mobile device 140 is positioned so that camera 137 of mobile device 140 is oriented towards reference location 152 on electronic equipment rack door 154. This orientation is maintained by a user throughout the horizontal scan operation, allowing the camera 137 to measure distances between the mobile device 140 and the reference location 152. In some embodiments, the horizontal scan operation may begin at a location adjacent to side surface 139 of the electronic equipment rack 138, so that an electronic device, e.g., 105C, located near the side surface 139 of the electronic equipment rack 138 may be properly identified, and so that the width of the electronic equipment rack 138 may be accurately measured.

According to embodiments, during a horizontal scan operation, the user moves the mobile device 140 laterally along a horizontal axis from the side surface 139 towards the reference location 152. It may be understood that some vertical motion may occur during the horizontal scan operation, for example, as a result of instability of a user's hand while moving mobile device 140. As mobile device 140 is moved laterally, it reads data from NFC tags 122 and takes measurements of distance between the mobile device 140 and the reference location 152. In some embodiments, the horizontal scan operation is completed when the mobile device 140 is within a minimum distance of reference location 152. In some embodiments, the horizontal scan operation is completed when the mobile device 140 comes sufficiently close to reference location 152 to read the NFC tag 122 closest to electronic equipment rack door 154.

In some embodiments, the mobile device 140 can be configured to provide feedback to a user in response to the positioning, during a horizontal scan operation, of the mobile device relative to the electronic equipment rack. For example, a sound, tone, or vibrational alert may be used to notify the user that the mobile device 140 is not within a read range "r" of any NFC tags 122. Such feedback may be useful in assisting the user with correct positioning of the mobile device 140 to properly read NFC tags 122 and measure distances between the mobile device 140 and electronic equipment rack door 154 during the horizontal scan operation. According to embodiments, data values read from NFC tags 122 and corresponding distance measurements are associatively recorded, for example, in a memory or data storage device, within the mobile device 140.

According to embodiments, following the vertical, and possible horizontal scan operations, electronic device 140 can create a map depicting the absolute and/or relative position of the electronic devices 101-113 located within the electronic equipment rack 138. In embodiments, such a map can be displayed on smartphone, tablet or other electronic device, or can be sent to remote location or uploaded to a server.

FIG. 2 includes a side view diagram 200 depicting a scan operation consistent with the scan operation of FIG. 1A, and Tables 250 and 275, which illustrate initial, "unprocessed", NFC tag scan results, and an NFC tag map, respectively, according to embodiments consistent with the figures. Diagram 200 and tables 250, 275 can be useful in illustrating the results of reading, recording and processing of electronic device serial numbers contained within NFC tags 122. Such electronic device serial numbers can be useful for locating and mapping electronic devices 101-113 within an electronic equipment rack 138.

Diagram 200 illustrates the correspondence between electronic devices 101-113, located within electronic equipment rack 138, and electronic device serial numbers SN01-SN13, contained within NFC tags 122 attached to the electronic devices 101-113. The electronic device serial numbers SN01-SN13 can be used to uniquely identify, i.e., serve as a "name tag", for corresponding electronic devices 101-113. Diagram 200 depicts locations corresponding to electronic devices 101-104 and 108-113 that have a single electronic device occupying a single, vertical, location or position. Diagram 200 also depicts multiple electronic devices 105A, 105B and 105C occupying the same vertical location by being installed in a "side-by-side" orientation at the same height within the electronic equipment rack 138.

During scanning operation(s), a mobile device 140 is moved past and reads data stored within NFC tags 122 while taking distance measurements between the mobile device 140 and reference location(s). Following the NFC tag reading and taking of distance measurements, the NFC tag data is recorded, in association with the corresponding distance measurements, within the mobile device 140.

According to embodiments, Table 250 represents sets of electronic device serial numbers placed in a vertical position corresponding to the vertical position at which the serial numbers were read from NFC tags 122 by mobile device 140. Table 250 can represent data contained within a file or data structure within the mobile device 140, such as a spreadsheet, database, text file or memory device.

As the mobile device 140 is moved during a vertical scanning operation, the read range "r" of the mobile device 140 will encompass certain set of NFC tags 122 as it passes by them. For example, during a vertical scan starting at the top surface 141 of electronic equipment rack 138, mobile device 140 may initially be within the read range "r" of, and read serial numbers SN01 and SN02 from NFC tags 122. As the mobile device 140 is moved downward, adjacent to the electronic device 102, the current set of serial numbers read may change to SN01, SN02 and SN03. The vertical scan continues with the set of read serial numbers, i.e., "read set", at each successive read location changing to include those serial numbers within the read range "r" of the repositioned mobile device 140.

As mobile device 140 is moved towards a particular NFC tag, that NFC tag's electronic device serial number will be included in the current "read set". For example, electronic device serial number SN03 is "added" to the second read set in Table 250, when compared to the first read set of SN01 and SN02. Similarly, as mobile device 140 passes by and is moved away from a particular NFC tag, that NFC tag's electronic device serial number will be removed from the current read set. For example, electronic device serial number SN01 is "removed" from the third grouping in Table 250, when compared to the second grouping of SN01, SN02 and SN03. The sets of serial numbers read from NFC tags at particular locations are listed within Table 250. Table 250 represents "unprocessed" electronic device serial numbers as read from sets of NFC tags 122; no processing, sorting or filtering of the serial numbers is represented by the data in Table 250.

For purposes of illustration, consistent with FIG. 1A, during a vertical scan operation, of NFC tags 122 arranged in a vertical "stack", the read range "r" of the mobile device 140 can include a maximum of three NFC tags 122. For example NFC tags 122 containing serial numbers SN01, SN02 and SN03 represent such an arrangement. In addition, a number of NFC tags attached to electronic devices arranged in a "side-by-side" configuration, e.g., 105A, 105B and 105C, may also be within the read range "r" when the mobile device 140 is positioned at a particular location. Table 250 therefore includes the serial numbers associated with both vertically and horizontally arranged electronic devices located within a read range "r" of the mobile device 140.

According to embodiments, during or following vertical and horizontal scanning operation(s), a mobile device 140 can execute a method of processing/sorting sets of read NFC tags represented by Table 250. The method may be useful in producing a table or map 275 representing calculated vertical and horizontal positions of electronic devices located within the electronic equipment rack 138. In embodiments, the recorded NFC tag "read sets" contained in Table 250 can be sequentially compared, for example, in a "top-to-bottom" order, to determine differences in serial numbers included in sequential read sets.

For example, in the scan results of a vertical scan operation, if a particular serial number is "removed" from a particular read set while certain other serial numbers remain in the set, that serial number is positioned, within Table 275, above the other serial numbers of the read set. For example, electronic device serial number SN01 is "removed" from the third grouping in Table 250, when compared to the second grouping of serial numbers SN01, SN02 and SN03, and is therefore placed above serial numbers SN02 and SN03 in NFC tag map 275. Similarly, if a particular serial number is "added" to a particular read set while certain other serial numbers are present in the set, that serial number is positioned, within Table 275, below the other serial numbers of the read set. For example, electronic device serial number SN03 is "added" to the second read set in Table 250, when compared to the first read set of SN01 and SN02, and is therefore placed below serial numbers SN01 and SN02 in NFC tag map 275.

Similarly, horizontal position/distance measurement information stored in mobile device 140, e.g., within table 250, can be used to calculate the relative horizontal position of electronic devices within the electronic equipment rack. For example, associated distance measurements and read NFC tag data can be used by a method executed by mobile device 140 to determine a horizontal ordering of electronic devices located at the same vertical position, e.g., electronic devices 105A, 105B and 105C.

According to embodiments, the method may use data contained within Table 1, such as the physical dimensions of electronic devices, to facilitate the sorting/mapping of the read electronic device serial numbers of Table 250. For example, a height of a particular electronic device may be referenced in order to allocate a certain number vertical positions within the Table 275 to that electronic device. Table 275, similar to Table 250 can represent data contained in a data structure or file within the mobile device 140, such as spreadsheet, database, text file or memory device.

In embodiments, a map consistent with Table 275, depicting positions of electronic devices within an electronic equipment rack, can be displayed on a screen of the mobile device 140. In some embodiments, such a map can be transmitted, in formats, including, but not limited to, Hyper Text Markup Language (HTML), a text file, a spreadsheet or a database, from the mobile device 140 to another electronic device such as another computer or server. File transmission can occur over a wired or wireless network including the Internet and/or local or proprietary networks.

It may be understood that a method of scanning and mapping electronic devices can include taking multiple, sequential distance measurements and corresponding readings of NFC tag data sets. For ease of discussion of the methods depicted in FIG. 3 and FIG. 4, the most recent distance measurement, read NFC tag data set, and read electronic device serial number(s) included in the figure discussion may be referred to as the "current distance measurement", "current NFC tag data set", and "current (set of) serial number(s)", respectively. Similarly, a preceding distance measurement, read NFC tag data set, and read electronic device serial number(s) may be referred to as a "previous distance measurement", "previous NFC tag data set", and "previous (set of) serial number(s)", respectively.

A "current" distance measurement, NFC tag data set, or serial number may or may not be directly sequential with a "previous" distance measurement, NFC tag data set, or serial number, respectively. For example, in some embodiments, the current distance measurement may be the fifth measurement taken by the mobile device, and the previous distance measurement may be the fourth measurement taken by the mobile device. In some embodiments, the current distance measurement may be the fifth measurement taken, while the previous distance measurement may be the third measurement taken. In embodiments, both directly sequential and indirectly sequential distance measurements and readings of NFC tag data/serial numbers can each have certain advantages when used within a method of scanning and mapping electronic devices.

Figure 3:
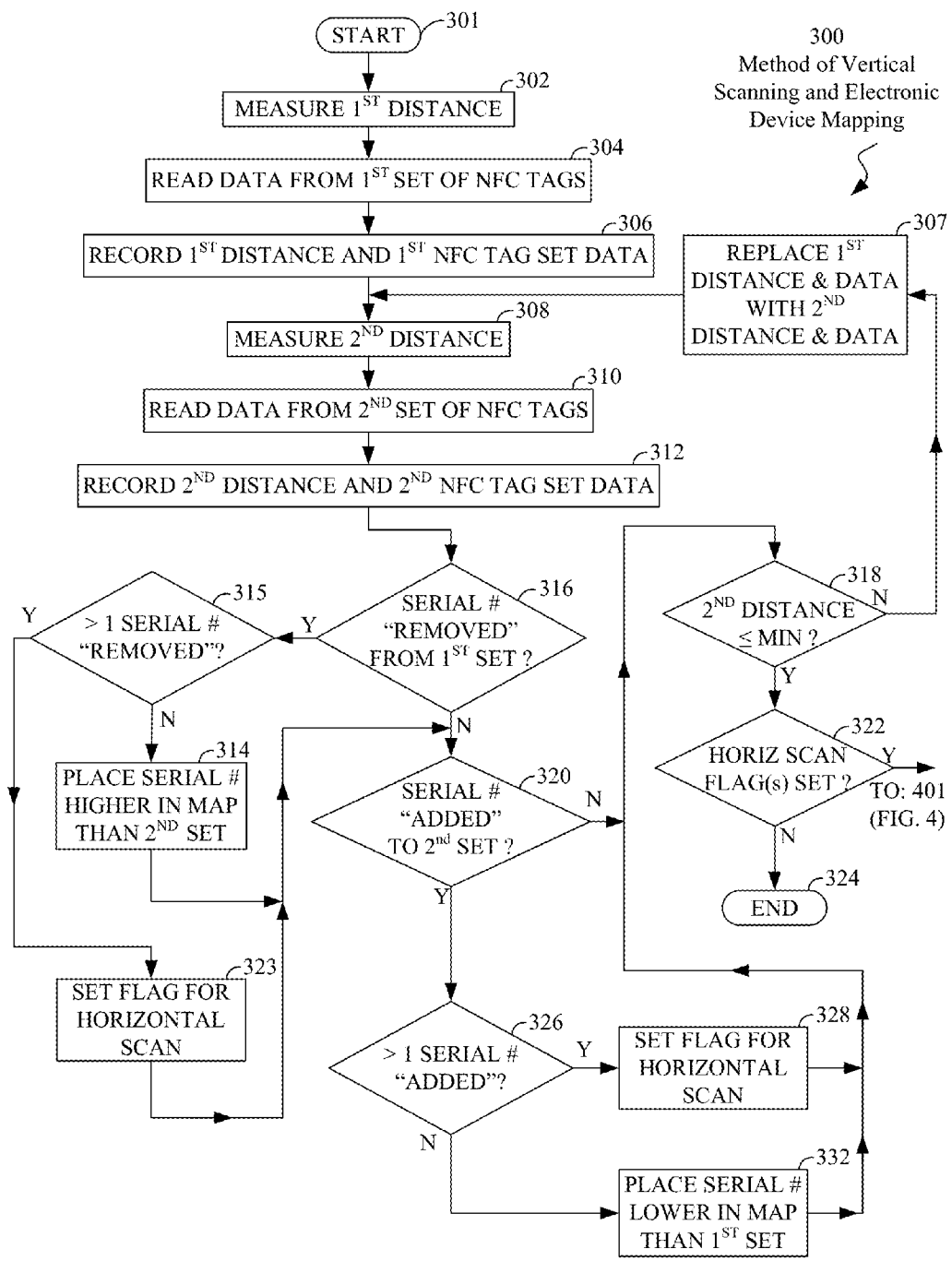
FIG. 3 is a flow diagram depicting a method of vertical scanning and electronic device mapping, according to embodiments consistent with the figures.
Figure 4:
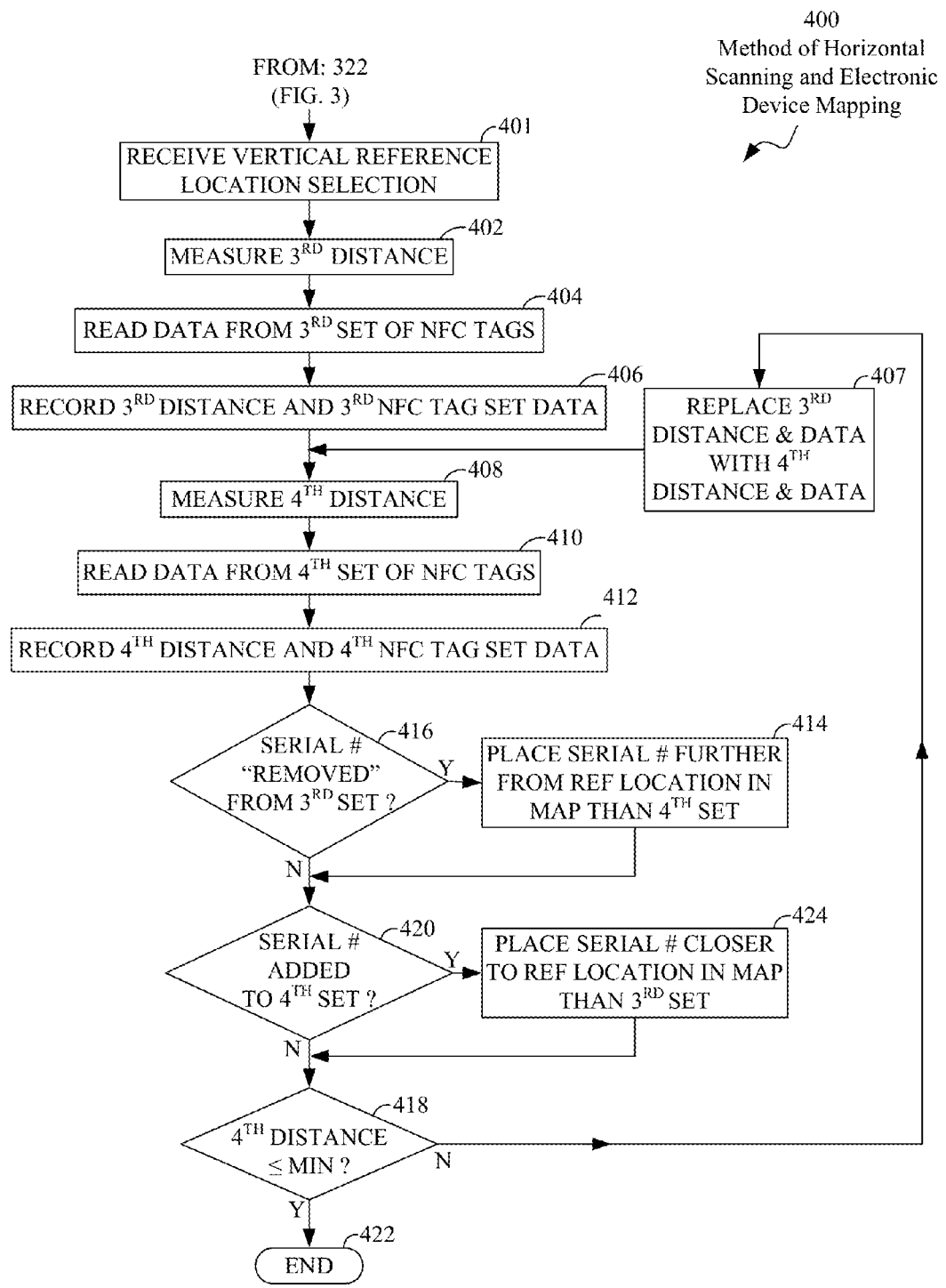
FIG. 4 is a flow diagram depicting a method of horizontal scanning and electronic device mapping, according to embodiments consistent with the figures.

The methods depicted in FIG. 3 and FIG. 4 may begin with a first set of distance measurements and a first set of NFC tag data readings being taken, which may be referred to herein as the "initial" or "current" sets. As the method progresses, a subsequent or second, more recent set of distance measurements and set of NFC tag data readings may be taken, which may then be referred to as the "current" sets, with the first set being subsequently referred to as the "previous" set. This progression of naming is maintained as the method continues performing distance measurements and reading NFC tag data sets.

FIG. 3 is a flow diagram depicting a method 300 of vertical scanning and electronic device mapping, according to embodiments consistent with the figures. The method 300 may be useful for collecting a set of distance/height measurements that corresponds to sets of read NFC tag data. Corresponding height measurements and read NFC tag data can then be processed by a mobile device, in order to create a map depicting the positions of electronic devices within an electronic equipment rack. The operations of method 300 are consistent with the scan operation and electronic system depicted in FIG. 1A and its associated description, as well as the scan operation, NFC tag scan results and NFC tag map depicted in FIG. 2. The method 300 moves from start 301 to operation 302.

Operation 302 generally refers to measuring with a mobile electronic device, at the start of the vertical scan operation, an initial vertical distance or height, between an initial mobile device location, and a reference location. According to embodiments, the initial mobile device location can be adjacent to or above a top surface of the electronic equipment rack, and the reference location can be on a floor or other surface supporting the electronic equipment rack. In embodiments, the initial distance or height between the mobile device and the reference location can be measured using a camera and associated auto-focus and/or distance measurement software incorporated into the mobile device. Measuring an initial height can be useful in determining the height of the electronic equipment rack. Once the initial height is measured, the method moves to operation 304.

Operation 304 generally refers to reading data from a first, initial set of NFC tags located within a read range of the initial mobile device location. According to embodiments, data read from the initial set of NFC tags can include unique electronic device identifiers, such as serial numbers, corresponding to electronic devices located adjacent to the top of the electronic equipment rack. Unique electronic device serial numbers can be useful, in conjunction with distance measurement taken in operation 302, in determining the vertical position or location of particular electronic device(s). Once the data from the initial set of NFC tags is read, the method moves to operation 306.

Operation 306 generally refers to recording the initial height measured in operation 302 and the data read from the initial set of NFC tags read in operation 304. According to embodiments, the initial height measurement and the corresponding initial NFC tag data are associatively written into an electronic file such as a text file, spreadsheet or database, or into a memory circuit, within the mobile device. The initial height measurement and corresponding initial NFC tag data can be associated, for example, by being written into file or memory locations referenced by the same index value or that are addressed using the same address value. Such association can be useful when retrieving height measurements and NFC tag data for further processing and creation of an electronic device location map. After the data from the initial set of NFC tags and initial height measurement are recorded in the mobile device, the mobile device is moved further towards the reference location, and the method moves to operation 308. Hereafter, the "initial height", "initial NFC tag data" and the "initial set of NFC tags" measured and read in operations 302 and 304, respectively and recorded in operation 306 will be referred to as the "previous height", "previous NFC tag data" and the "previous set of NFC tags", respectively, for the sake of clarity and consistent terminology throughout the Specification.

Operation 308 generally refers to measuring, with the mobile device, a current vertical distance or height, between the current mobile device location adjacent to the electronic equipment rack, and the reference location. According to embodiments, the current mobile device location can be between the top surface of the electronic equipment rack and the reference location, along a vertical axis below the previous mobile device location. Measuring a current height can be useful in determining locations of electronic devices within the electronic equipment rack. Once the current height is measured, the method moves to operation 310.

Operation 310 generally refers to reading data from a current set of NFC tags located within a read range of the current mobile device location. According to embodiments, data read from the current set of NFC tags includes unique electronic identifiers such as device serial numbers corresponding to electronic devices located in the read range of the mobile device at the current location. Once the data from the current set of NFC tags is read, the method moves to operation 312.

Operation 312 generally refers to recording the current height measured in operation 308 and the data read from the current set of NFC tags read in operation 310. According to embodiments, the current height measurement and the corresponding current NFC tag data are associatively written into an electronic file such as a text file, spreadsheet or database, or into a memory circuit, within the mobile device. The current height measurement and corresponding current NFC tag data can be associated, for example, by being written into file or memory locations referenced by the same index value or that are addressed using the same address value. After the data from the current set of NFC tags and the current height measurement are recorded in the mobile device, the mobile device is moved further, along a vertical axis, towards the reference location, and the method moves to operation 316.

For ease of discussion, it may be understood that in embodiments, the data contained in each NFC tag attached to an electronic device includes a corresponding, unique electronic device identifier such as a serial number. It may be further understood that "reading a serial number" or "reading a set of serial numbers" include the mobile device extracting the serial number or set of serial numbers from data contained within the corresponding read NFC tag or set of read NFC tags, respectively. Such serial number(s) may be referred to herein as a "read serial number" or "set of read serial numbers".

At operation 316, a determination is made regarding whether any serial numbers are included in the previous set of read serial numbers and absent from the current set of read serial numbers. According to embodiments, the mobile device performs a comparison of the previous set of read serial numbers against the current set. Any serial numbers that are included in the previous set and absent from the current set of read serial numbers can indicate that the corresponding electronic device(s) is located above electronic devices of the previous set. If any serial numbers are present in the previous set of read serial numbers, and absent from the current set, the method moves to operation 315. If the present set of read serial numbers includes all of the serial numbers of the previous set, the method moves to operation 320.

At operation 320, a determination is made regarding whether any serial numbers are absent from the previous set of read serial numbers and are included in the current set of read serial numbers. According to embodiments, the mobile device performs a comparison of the previous set of read serial numbers against the current set. Any serial numbers included in the current set and absent from the previous set can indicate that the corresponding electronic device(s) are located below electronic devices of the previous set. If any serial numbers are present in the current set, and absent from the previous set of read serial numbers, the method moves to operation 326. If the previous set of read serial numbers and the current set of read serial numbers are the same, the method moves to operation 318.

At operation 326, determinations are made regarding a count of serial numbers "added" to the current set of read serial numbers, as compared to the previous set, and regarding at least one electronic device with a serial number in the current set of read serial numbers having a width less than an electronic equipment rack width. According to embodiments, a mobile device located adjacent to electronic equipment rack can read multiple NFC tags and corresponding included serial numbers. More than one serial number being simultaneously "added" or appearing in the current set of read serial numbers can be a useful indicator of multiple horizontally arranged electronic devices located at a particular vertical position, e.g., 105A, 105B, 105C in FIG. 1A and FIG. 1B.

An electronic device width less than an electronic equipment rack width can also be a useful indicator of multiple horizontally arranged electronic devices at a particular vertical position. In embodiments, data from a table contained within the mobile device, e.g., Table 1, including physical dimensions, i.e., width, of electronic devices can be used in this determination. For example a read serial number can be used as an index to the table, and the corresponding electronic device width can be retrieved and compared against a width of electronic equipment rack or other electronic device widths.

If more than one serial number has been added to the current set of read serial numbers and/or if at least one electronic device has a width less than the electronic equipment rack width, the method moves to operation 328. If not more than one serial number has been added to the current set of read serial numbers and no electronic device in the current set has a width less than the electronic equipment rack width, the method moves to operation 332.

At operation 315, determinations are made regarding a count of serial numbers "removed" from the current set of read serial numbers, as compared to the previous set, and regarding at least one electronic device with a serial number in the current set of read serial numbers having a width less than an electronic equipment rack width. According to embodiments, a mobile device located adjacent to electronic equipment rack can read multiple NFC tags and corresponding included serial numbers. More than one serial number being simultaneously "removed" from the current set of read serial numbers, when compared to the previous set, can be a useful indicator of multiple horizontally arranged electronic devices located at a particular vertical position, e.g., 105A, 105B, 105C in FIG. 1A and FIG. 1B.

An electronic device width less than an electronic equipment rack width can also be a useful indicator of multiple horizontally arranged electronic devices at a particular vertical position. In embodiments, data from a table contained within the mobile device, e.g., Table 1, including physical dimensions, i.e., width, of electronic devices can be used in this determination. For example a read serial number can be used as an index to the table, and the corresponding electronic device width can be retrieved and compared against a width of electronic equipment rack or other electronic device widths.

If more than one serial number has been removed from the current set of read serial numbers and/or if at least one electronic device has a width less than the electronic equipment rack width, the method moves to operation 323. If not more than one serial number has been removed from the current set of read serial numbers and no electronic device in the current set has a width less than the electronic equipment rack width, the method moves to operation 314.

Operation 314 generally refers to positioning or recording, within a table, map or other data structure within the mobile device, a serial number above or before serial numbers of the current set of read serial numbers. The position that the serial number is recorded in will generally correspond to the previous height measurement. According to embodiments, the serial number is placed in response to a determination made in operation 316. Positioning the serial number within a table or map is useful in creating a correspondence between a calculated or determined position of the corresponding electronic device and an actual electronic device position in the electronic equipment rack. Once the serial number is placed within the table or map, the method moves to operation 320.

Operation 323 generally refers to setting a flag, within the mobile device, indicating that at least one condition which can trigger a horizontal scan operation has been met. Such conditions can include the detection of more than one "removed" serial number at a particular vertical location and the detection of an electronic device having a width less than the electronic equipment rack width, corresponding to operation 326. The flag can be, for example, a height measurement value stored in a file or within an electronic component such as a memory device, within the mobile device. According to embodiments, the height measurement value can correspond to a vertical location higher than the location(s) the current set of read serial numbers. The flag can be useful for initiating an indication, to a user, following the completion of the vertical scan operation, of the need for at least one horizontal scan operation to complete gathering of NFC tag data and corresponding distance measurements. Once the flag is set, the method moves to operation 320.

Operation 328 generally refers to setting a flag, within the mobile device, indicating that at least one condition which can trigger a horizontal scan operation has been met. Such conditions can include the detection of more than one "new" serial number at a particular vertical location and the detection of an electronic device having a width less than the electronic equipment rack width, corresponding to operation 326. The flag can be, for example, a height measurement value stored in a file or within an electronic component such as a memory device, within the mobile device. According to embodiments, the height measurement value can correspond to a vertical location lower than the location(s) the previous set of read serial numbers. The flag can be useful for initiating an indication, to a user, following the completion of the vertical scan operation, of the need for at least one horizontal scan operation to complete gathering of NFC tag data and corresponding distance measurements. Once the flag is set, the method moves to operation 318.

Operation 332 generally refers to positioning or recording, within a table, map or other data structure within the mobile device, a serial number in a position below or after all serial numbers of the previous set of read serial numbers. The position that the serial number is recorded in will generally correspond to the current height. According to embodiments, the serial number is placed in response to determinations made in operations 316, 320 and 326. Positioning the serial number within a table or map is useful in creating correspondence between a calculated or determined position of the corresponding electronic device and an actual position of the electronic device in the electronic equipment rack. Once the serial number is placed within the table or map, the method moves to operation 318.

At operation 318, a determination is made regarding the current height measurement made in operation 308. A current height measurement that is within a specified minimum distance, for example, less than a fraction of a rack unit ("RU") height, can indicate completion of the vertical scan operation. Insufficient distance may exist within which to continue to move the mobile device towards the horizontal reference location, and all vertically arranged NFC tags have been previously read. If the current height measurement is greater than the minimum distance, the method moves to operation 307. If the current height measurement is less than or equal to the minimum distance, the method moves to operation 322.

Operation 307 generally refers to replacing the previous height measurement and data read from the previous set of NFC tags with the current height measurement and the data read from the current set of NFC tags. This replacement can be useful in creating and/or or allocating locations in a memory unit or data structure for receiving a subsequent height measurement and data subsequently read from a set of NFC tags. In some embodiments, the previous height measurement and previous NFC tag data may be overwritten with the current height measurement and current NFC tag data, respectively, and the current height measurement and NFC tag data locations may be cleared. In some embodiments, one or more pointers, within the mobile device, that indicate the location of the current and previous height measurements and NFC tag data may be updated or incremented to point to appropriate data storage locations. Once the previous height measurement and NFC tag data have been replaced with the current height measurement and data NFC tag data, the method returns to operation 308.

At operation 322, a determination is made regarding whether at least one horizontal scan flag was set in operations 323 or 328. A horizontal scan flag can be used by a mobile device as an indicator and/or initiator of a horizontal scan operation. If the horizontal scan flag is set, the method moves to operation 401, FIG. 4. If the horizontal scan flag is not set, the method 300 may end at block 324.

FIG. 4 is a flow diagram depicting a method 400 of horizontal scanning and electronic device mapping, according to embodiments consistent with the figures. The method 400 may be useful for collecting at least one set of lateral distance/position measurements corresponding to sets of read NFC tag data. In some embodiments, the operations of method 400 can be performed in conjunction with the vertical scanning and mapping operations depicted in method 300, FIG. 3 and its associated description. In some embodiments, the method 400 can be performed multiple times, in correspondence to multiple horizontal scan flags set during the execution of method 300. Corresponding collected lateral distance measurements and read NFC tag data can be subsequently processed by a mobile device, in order to create a map depicting the positions of electronic devices located within an electronic equipment rack. The operations of method 400 are consistent with the scan operation and electronic system depicted in FIG. 1B and its associated description.

The horizontal scan operation can begin with a mobile device being held, by a user, adjacent to a vertical surface of an electronic equipment rack. For example, the vertical surface can be a side of the electronic equipment rack opposite from another vertical surface, such as an open electronic equipment rack door, that can serve as a reference location. For ease of discussion and illustration, a horizontal scan operation will be described herein as starting adjacent to a vertical surface or side of an electronic equipment rack, with the mobile device subsequently being moved by a user along a horizontal axis towards the reference location. This illustration and discussion, however, are not limiting; in some embodiments the horizontal scan operation may begin at or near the reference location and progress laterally towards the vertical surface or side of the electronic equipment rack.

In some embodiments, the method 400 may be initiated in response to the detection, in operation 322, FIG. 3, of a horizontal scan flag that was previously set. In some embodiments, the method 400 may include generating and communicating instructions regarding a horizontal scan operation, to a user. Such instructions can be communicated, for example, through a display screen or speaker of the mobile device. The instructions may specify, for example, that the user position the mobile device at a particular location, adjacent to the electronic equipment rack, that corresponds to a height measurement value included in the horizontal scan flag. Instructions may then specify that the user open a door of the electronic equipment rack to serve as a reference location, and subsequently orient and move the mobile device towards the reference location.

The method 400 is begun at operation 401. Operation 401 generally refers to the mobile device receiving, from a user, an indication of which side of the electronic equipment rack the vertical reference location is adjacent to. The mobile device may receive input through its touchscreen, from a user, for example, indicating that the reference location is on either the left or the right side of the electronic equipment rack. An indication of the reference location side can be useful for orienting subsequent scanning and mapping operations, providing correct lateral positioning of detected electronic devices, and generating a corresponding positional map of such devices. Once the mobile device has received an indication of the vertical reference location orientation, the method moves to operation 402.

Operation 402 generally refers to measuring with a mobile electronic device, at the start of the horizontal scan operation, an initial lateral distance or width, between an initial mobile device location, and a reference location. According to embodiments, the initial mobile device location can be adjacent to, or to the side of, the electronic equipment rack, and the reference location can be located on an electronic equipment rack door or other vertical surface adjacent to the electronic equipment rack. In embodiments, the initial mobile device location can be adjacent to a front surface of the electronic equipment rack, between a side of the electronic equipment rack and the reference location. In embodiments, the lateral distance between the mobile device and the reference location can be measured using a camera and associated auto-focus and/or distance measurement software incorporated into the mobile electronic device. Measuring an initial lateral distance can be useful in determining the width of the electronic equipment rack. Once the initial lateral distance is measured, the method moves to operation 404.

Operation 404 generally refers to reading data from a first, initial set of NFC tags located within a read range of the initial mobile device location. According to embodiments, data read from the initial set of NFC tags can include unique electronic device identifiers, such as serial numbers, corresponding to electronic devices located adjacent to a side of the electronic equipment rack. Unique electronic device serial numbers can be useful, in conjunction with distance measurement taken in operation 402, in determining a horizontal position or location of particular electronic device(s). Once the data from the initial set of NFC tags is read, the method moves to operation 406.

Operation 406 generally refers to recording the initial lateral distance measured in operation 402 and the data read from the initial set of NFC tags read in operation 404. According to embodiments, the initial lateral distance measurement and the corresponding initial NFC tag data are associatively written into an electronic file such as a text file, spreadsheet or database, or into a memory circuit, within the mobile device. The initial lateral distance measurement and corresponding initial NFC tag data can be associated, for example, by being written into file or memory locations referenced by the same index value or that are addressed using the same address value. After the data from the initial set of NFC tags and initial lateral distance measurement are recorded in the mobile device, the mobile device is moved further laterally towards the reference location, and the method moves to operation 408. Hereafter, the "initial lateral distance," "initial NFC tag data" and the "initial set of NFC tags" measured and read in operations 402 and 404, respectively and recorded in operation 406 will be referred to as the "previous lateral distance", "previous NFC tag data" and the "previous set of NFC tags", respectively, for the sake of clarity and consistent terminology throughout the Specification.

Operation 408 generally refers to measuring, with the mobile device, a current lateral distance between the current mobile device location adjacent to the electronic equipment rack, and the reference location. According to embodiments, the current mobile device location can be between a side surface of the electronic equipment rack and the reference location, along a horizontal axis from the previous mobile device location. Measuring a current lateral distance can be useful in determining horizontal positions of electronic devices within the electronic equipment rack. Once the current lateral distance is measured, the method moves to operation 410.

Operation 410 generally refers to reading data from a current set of NFC tags located within a read range of the current mobile device location. According to embodiments, data read from the current set of NFC tags includes unique electronic identifiers such as device serial numbers corresponding to electronic devices located in the read range of the mobile device at the current location. Once the data from the current set of NFC tags is read, the method moves to operation 412.

Operation 412 generally refers to recording the current lateral distance measured in operation 408 and the data read from the current set of NFC tags read in operation 410. According to embodiments, the current lateral distance measurement and the corresponding current NFC tag data are associatively written into an electronic file such as a text file, spreadsheet or database, or into a memory circuit, within the mobile device. The current lateral distance measurement and corresponding current NFC tag data can be associated, for example, by being written into file or memory locations referenced by the same index value or that are addressed using the same address value. After the data from the current set of NFC tags and the current lateral distance measurement are recorded in the mobile device, the mobile device is moved further laterally, along a horizontal axis, towards the reference location, and the method moves to operation 416.

At operation 416, a determination is made regarding whether any serial numbers are included in the previous set of read serial numbers and absent from the current set of read serial numbers. According to embodiments, the mobile device performs a comparison of the previous set of read serial numbers against the current set. Any serial numbers that are included in the previous set and absent from the current set of read serial numbers can indicate that the corresponding electronic device(s) is located further from the reference location than the electronic devices of the current set. If any serial numbers are present in the previous set of read serial numbers, and absent from the current set, the method moves to operation 414. If the present set of read serial numbers includes all of the serial numbers of the previous set, the method moves to operation 420.

Operation 414 generally refers to positioning or recording, within a table, map or other data structure within the mobile device, a serial number in a position indicating that the corresponding electronic device is located further from the horizontal reference location than electronic devices corresponding to other serial numbers of the current set of read serial numbers. The position that the serial number is recorded in will generally correspond to the previous distance measurement. Following the current example, the serial number would be placed, within the table, to the right of the current set of read serial numbers. According to embodiments, the serial number is placed in response to a determination made in operation 416. Positioning the serial number within a table or map is useful in creating a correspondence between a calculated or determined position of the corresponding electronic device and an actual electronic device position in the electronic equipment rack. Once the serial number is placed within the table or map, the method moves to operation 420.

At operation 420, a determination is made regarding whether any serial numbers are absent from the previous set of read serial numbers and are included in the current set of read serial numbers. According to embodiments, the mobile device performs a comparison of the previous set of read serial numbers against the current set. Any serial numbers included in the current set and absent from the previous set can indicate that the corresponding electronic device(s) are located closer to the horizontal scan reference location than electronic devices of the previous set. If any serial numbers are present in the current set, and absent from the previous set of read serial numbers, the method moves to operation 424. If the previous set of read serial numbers and the current set of read serial numbers are the same, the method moves to operation 418.

Operation 424 generally refers to positioning, within a table, map or other data structure within mobile device, a serial number in a position indicating that the corresponding electronic device is located closer to the horizontal reference location than electronic devices corresponding to the previous set of read serial numbers. The position that the serial number is recorded in will generally correspond to the current lateral distance. Following the current example, the serial number would be placed, within the table, to the left of the previous set of read serial numbers. According to embodiments, the serial number is placed in response to determinations made in operation 420. Positioning the serial number within a table or map is useful in creating correspondence between a calculated or determined position of the corresponding electronic device and an actual position of the electronic device in the electronic equipment rack. Once the serial number is placed within the table or map, the method moves to operation 418.

At operation 418, a determination is made regarding the current lateral distance measurement made in operation 408. A current lateral distance measurement that is within a specified minimum distance, for example, less than a fraction of a rack unit ("RU") width, can indicate completion of the horizontal scan operation. Insufficient distance may exist within which to continue to move the mobile device towards the horizontal reference location, and all horizontally arranged NFC tags have been previously read. If the current lateral distance measurement is greater than the minimum distance, the method moves to operation 407. If the current lateral distance measurement is less than or equal to the minimum distance, the method 400 may end at block 422.

Operation 407 generally refers to replacing the previous lateral distance measurement and data read from the previous set of NFC tags with the current lateral distance measurement and the data read from the current set of NFC tags. This replacement can be useful in creating and/or or allocating locations in a memory unit or data structure for receiving a subsequent lateral distance measurement and data subsequently read from a set of NFC tags. In some embodiments, the previous lateral distance measurement and previous NFC tag data may be overwritten with the current lateral distance measurement and current NFC tag data, respectively, and the current lateral distance measurement and NFC tag data locations may be cleared. In some embodiments, one or more pointers, within the mobile device, that indicate the location of the current and previous lateral distance measurements and NFC tag data may be updated or incremented to point to appropriate data storage locations. Once the previous lateral distance measurement and NFC tag data have been replaced with the current lateral distance measurement and NFC tag data, the method returns to operation 408.

The flow diagrams depicted in FIG. 3 and FIG. 4 are non-limiting examples describing a method of reading a set of unique NFC tags attached to electronic devices and subsequently determining the absolute and/or relative positions of such devices. In some embodiments, the decisions involved in determining the position of a particular electronic device may be executed while the scan operation(s) is in progress, in an "on-the-fly" manner. In some embodiments, the decisions involved in determining the position of a particular electronic device may be executed following the completion of the scan operation(s). Although the flow diagrams in the figures depict a particular order of positional decision-making, the order of such decisions may differ, while still remaining within the spirit and scope of the disclosure.

Figure 5:
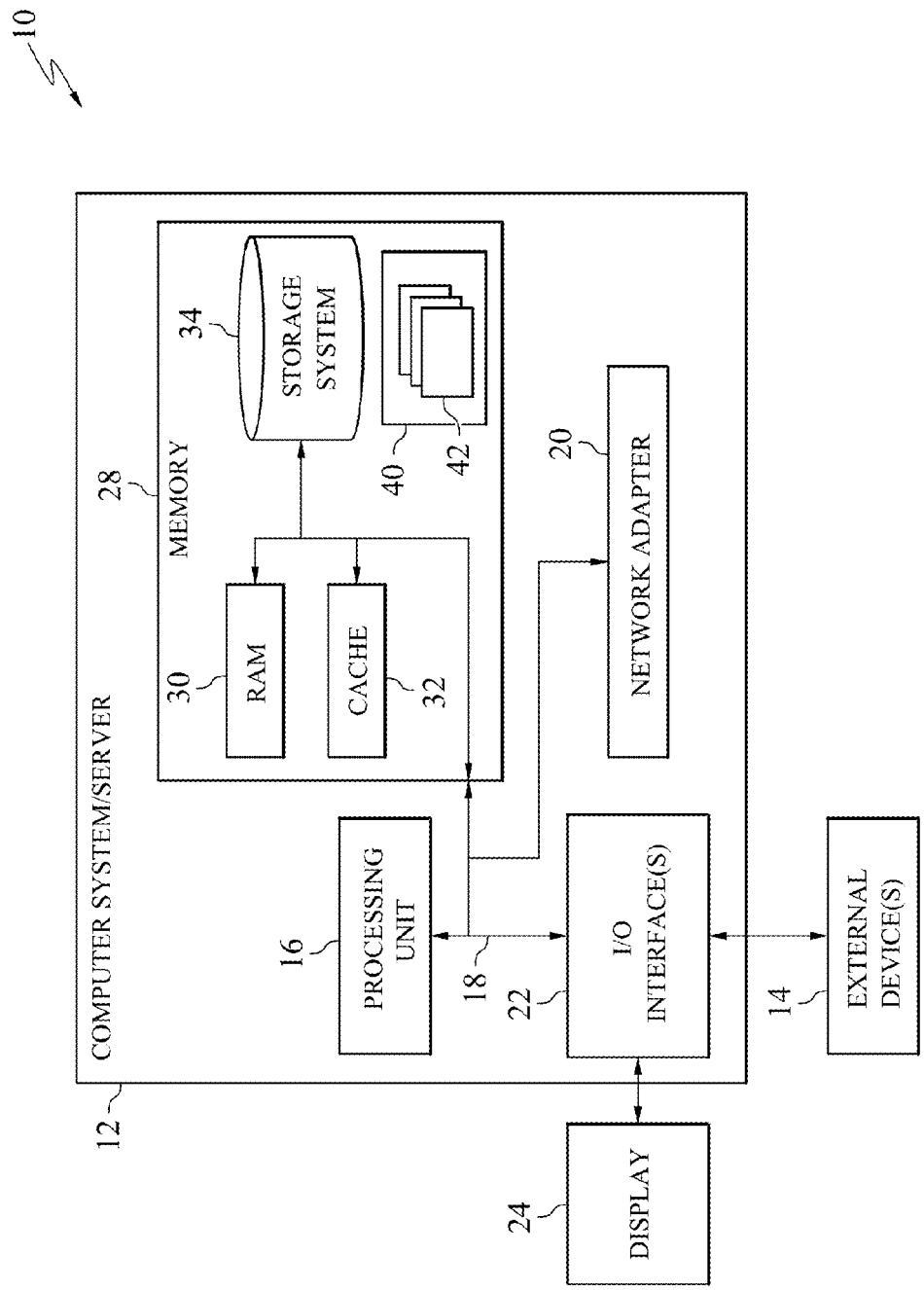
FIG. 5 depicts a computing node according to an embodiment of the present disclosure.

Referring now to FIG. 5, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
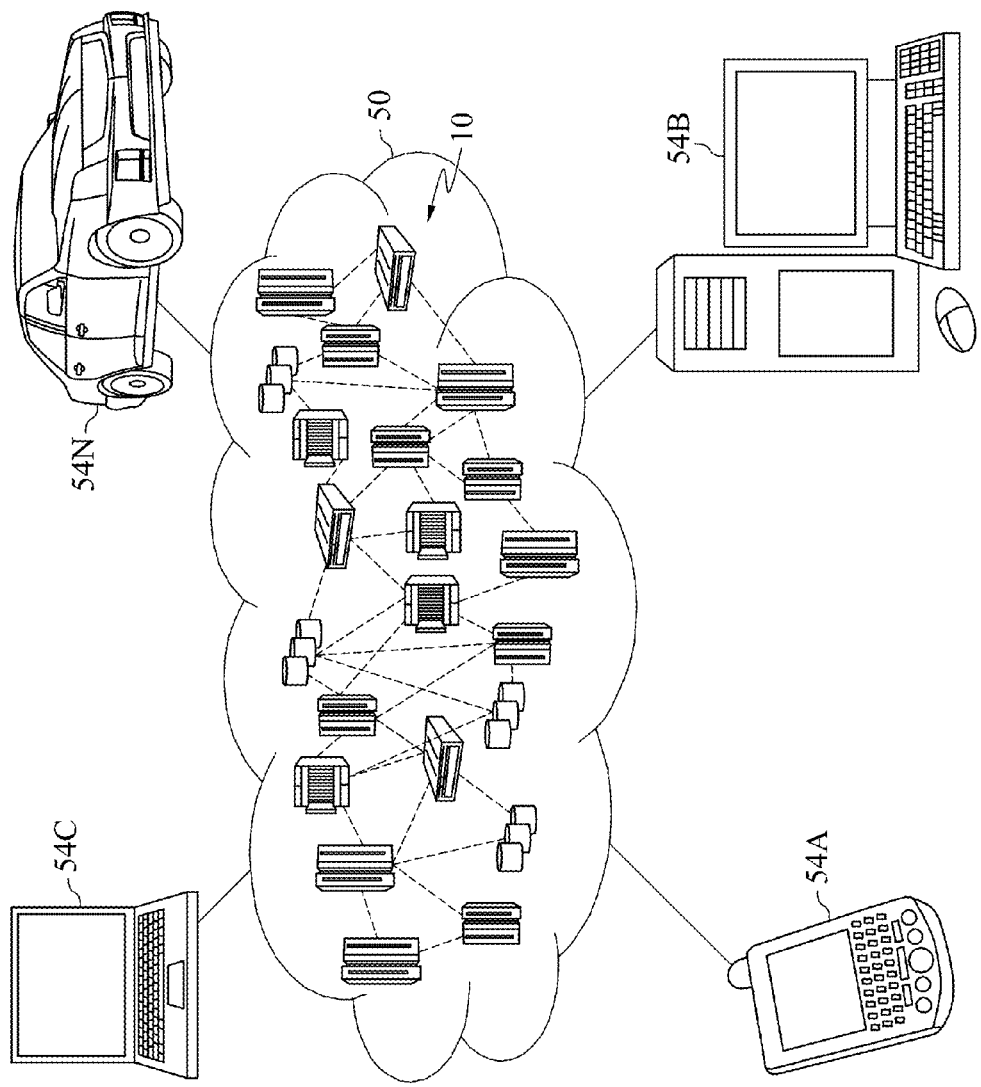
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
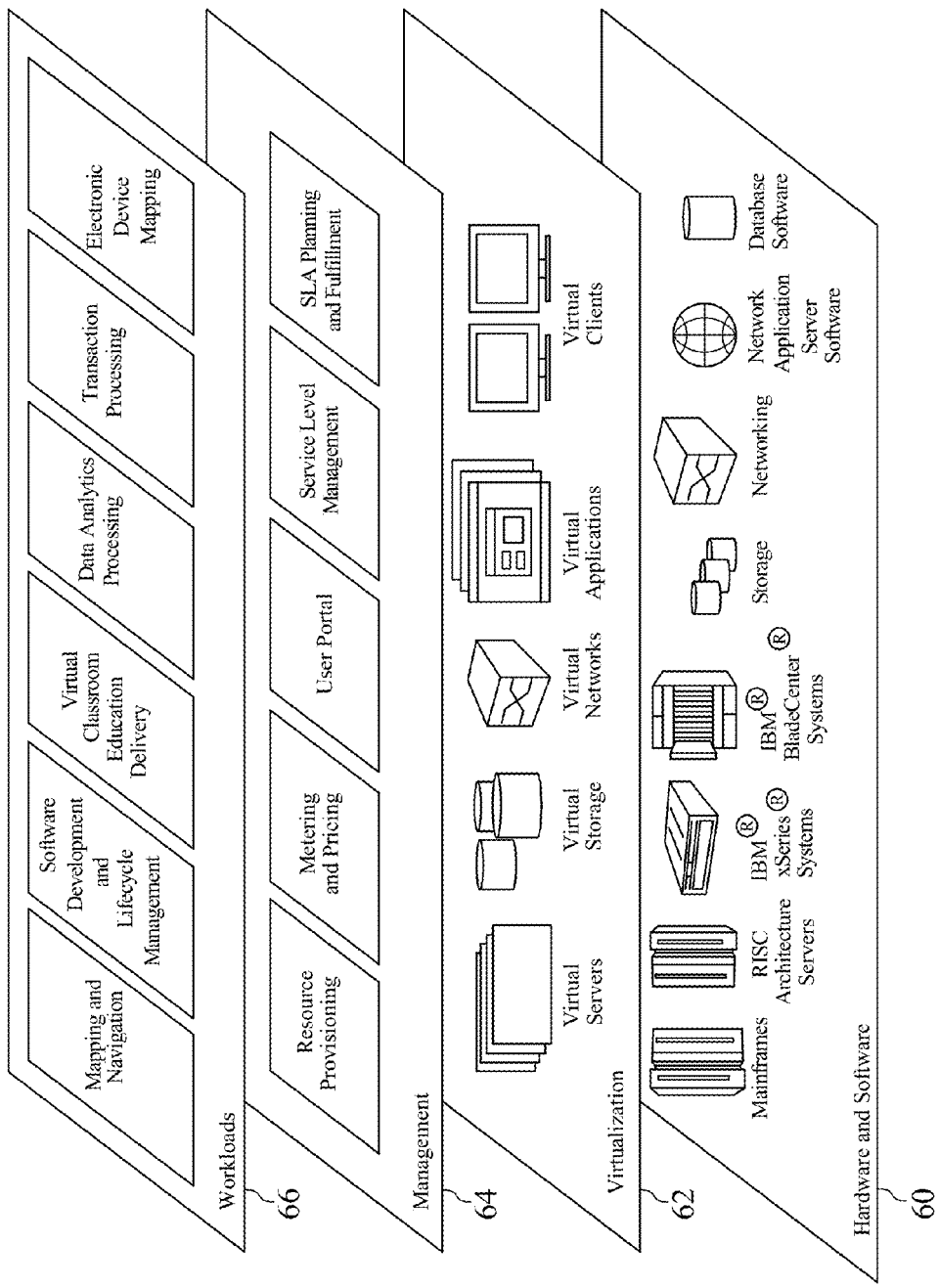
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic device mapping 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
an electronic equipment rack housing a plurality of electronic hardware devices;
the plurality of electronic hardware devices being operatively connected within the electronic equipment rack;
a set of near field communication (NFC) tags, each NFC tag of the set of NFC tags attached to, and containing a unique serial number of, a corresponding electronic hardware device of the plurality of electronic hardware devices operatively connected within the electronic equipment rack; and
a mobile device comprising an NFC tag reader to read a set of data values from the set of NFC tags, the set of data values including unique serial numbers contained by the set of NFC tags, the mobile device further configured to measure a distance between a location of the mobile device and a reference location, and to record the set of data values read from the set of NFC tags in association with recording the distance to facilitate locating electronic hardware devices of the plurality of electronic hardware devices operatively connected within the electronic equipment rack.

2. The system of claim 1, wherein the mobile device is selected from the group consisting of: a cell phone, a smartphone and a tablet device.

3. The system of claim 1, wherein the mobile device includes a camera configured to determine a distance between the mobile device and the reference location.

4. The system of claim 1, wherein each electronic hardware device of the plurality of electronic hardware devices operatively connected within the electronic equipment rack is selected from the group consisting of: a server, a data storage device, a network device and a processor.

* * * * *